US009367136B2

(12) United States Patent
Latta et al.

(10) Patent No.: US 9,367,136 B2
(45) Date of Patent: Jun. 14, 2016

(54) HOLOGRAPHIC OBJECT FEEDBACK

(71) Applicant: MICROSOFT TECHNOLOGY LICENSING, LLC, Redmond, WA (US)

(72) Inventors: Stephen G. Latta, Seattle, WA (US); Adam G. Poulos, Redmond, WA (US); Cameron G. Brown, Redmond, WA (US); Daniel J. McCulloch, Kirkland, WA (US); Matthew Kaplan, Seattle, WA (US); Arnulfo Zepeda Navratil, Kirkland, WA (US); Jon Paulovich, Redmond, WA (US); Kudo Tsunoda, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 148 days.

(21) Appl. No.: 13/862,210

(22) Filed: Apr. 12, 2013

(65) Prior Publication Data
US 2014/0306891 A1     Oct. 16, 2014

(51) Int. Cl.
*G06F 3/01*     (2006.01)
*G02B 27/01*     (2006.01)

(52) U.S. Cl.
CPC .............. *G06F 3/017* (2013.01); *G02B 27/017* (2013.01); *G06F 3/011* (2013.01); *G06F 3/016* (2013.01); *G02B 2027/014* (2013.01); *G02B 2027/0138* (2013.01); *G02B 2027/0178* (2013.01); *G02B 2027/0187* (2013.01)

(58) Field of Classification Search
CPC ........................................ G06F 3/01
USPC .......................................... 345/7–8, 156–173
See application file for complete search history.

(56) References Cited

U.S. PATENT DOCUMENTS

| 5,991,085 | A | | 11/1999 | Rallison et al. |
|---|---|---|---|---|
| 6,031,519 | A | * | 2/2000 | O'Brien ........................ 345/156 |
| 6,421,048 | B1 | | 7/2002 | Shih et al. |
| 6,552,722 | B1 | * | 4/2003 | Shih et al. ..................... 345/419 |

(Continued)

OTHER PUBLICATIONS

Plesniak, et al., "Spatial Interaction with Haptic Holograms", In Proceedings of IEEE International Conference on Multimedia Computing and Systems, Jul. 1999, 14 pages.

(Continued)

*Primary Examiner* — Grant Sitta
(74) *Attorney, Agent, or Firm* — Dan Choi; Judy Yee; Micky Minhas

(57) ABSTRACT

Methods for providing real-time feedback to an end user of a mobile device as they are interacting with or manipulating one or more virtual objects within an augmented reality environment are described. The real-time feedback may comprise visual feedback, audio feedback, and/or haptic feedback. In some embodiments, a mobile device, such as a head-mounted display device (HMD), may determine an object classification associated with a virtual object within an augmented reality environment, detect an object manipulation gesture performed by an end user of the mobile device, detect an interaction with the virtual object based on the object manipulation gesture, determine a magnitude of a virtual force associated with the interaction, and provide real-time feedback to the end user of the mobile device based on the interaction, the magnitude of the virtual force applied to the virtual object, and the object classification associated with the virtual object.

17 Claims, 12 Drawing Sheets

(56) References Cited

U.S. PATENT DOCUMENTS

| | | | |
|---|---|---|---|
| 6,690,338 B1* | 2/2004 | Maguire, Jr. | 345/8 |
| 7,225,404 B1* | 5/2007 | Zilles et al. | 715/701 |
| 2006/0209019 A1 | 9/2006 | Hu | |
| 2008/0059131 A1* | 3/2008 | Tokita | G06F 3/011 703/5 |
| 2008/0094351 A1* | 4/2008 | Nogami et al. | 345/156 |
| 2008/0266323 A1* | 10/2008 | Biocca | G06F 3/014 345/633 |
| 2009/0066725 A1* | 3/2009 | Nogami et al. | 345/632 |
| 2009/0177452 A1* | 7/2009 | Ullrich | G09B 23/285 703/11 |
| 2009/0195538 A1 | 8/2009 | Ryu et al. | |
| 2010/0053151 A1* | 3/2010 | Marti et al. | 345/419 |
| 2010/0177064 A1 | 7/2010 | Cragun | |
| 2011/0080273 A1* | 4/2011 | Kawai et al. | 340/407.1 |
| 2011/0109545 A1 | 5/2011 | Touma et al. | |
| 2011/0128555 A1* | 6/2011 | Rotschild | G02B 27/2271 356/625 |
| 2011/0148607 A1* | 6/2011 | Zeleny | A41D 13/0015 340/407.1 |
| 2011/0270135 A1* | 11/2011 | Dooley et al. | 600/595 |
| 2012/0062445 A1* | 3/2012 | Haddick et al. | 345/8 |
| 2012/0113223 A1* | 5/2012 | Hilliges | G06F 3/00 348/46 |
| 2012/0182135 A1* | 7/2012 | Kusuura | G06F 3/00 340/407.1 |
| 2012/0302289 A1 | 11/2012 | Kang | |
| 2013/0100008 A1* | 4/2013 | Marti et al. | 345/156 |
| 2013/0137076 A1* | 5/2013 | Perez et al. | 434/308 |
| 2013/0181913 A1* | 7/2013 | Cole et al. | 345/173 |

OTHER PUBLICATIONS

Kai-Mikael, "Three-dimensional Interaction and Presentation for Computer-Supported Cooperative Work", Retrieved on: Sep. 26, 2012, Available at: www.nada.kth.se/utbildning/forsk.utb/avhandlingar/lic/961009.pdf.

Salisbury, et al., "Haptic Rendering: Introductory Concepts", In IEEE Journals of Computer Graphics and Applications, Mar. 2004, 9 pages.

"International Search Report & Written Opinion for PCT Patent Application No. PCT/US2014/033245", Mailed Date: Jul. 23, 2014, Filed Date: Apr. 8, 2014, 12 Pages.

Buchmann, et al., "FingARtips: Gesture Based Direct Manipulation in Augmented Reality", In Proceedings of the 2nd International Conference on Computer Graphics and Interactive Techniques in Australasia and South East Asia, Jun. 15, 2004, pp. 212-221.

Amendments under Article 34 dated Nov. 5, 2014, PCT Patent Application No. PCT/US2014/033245.

"International Preliminary Report on Patentability Received for PCT Application No. PCT/US2014/033245", Mailed Date: Aug. 10, 2015, 9 Pages.

"Second Written Opinion Received for PCT Application No. PCT/US2014/033245", Mailed Date: Apr. 27, 2015, 8 Pages.

* cited by examiner

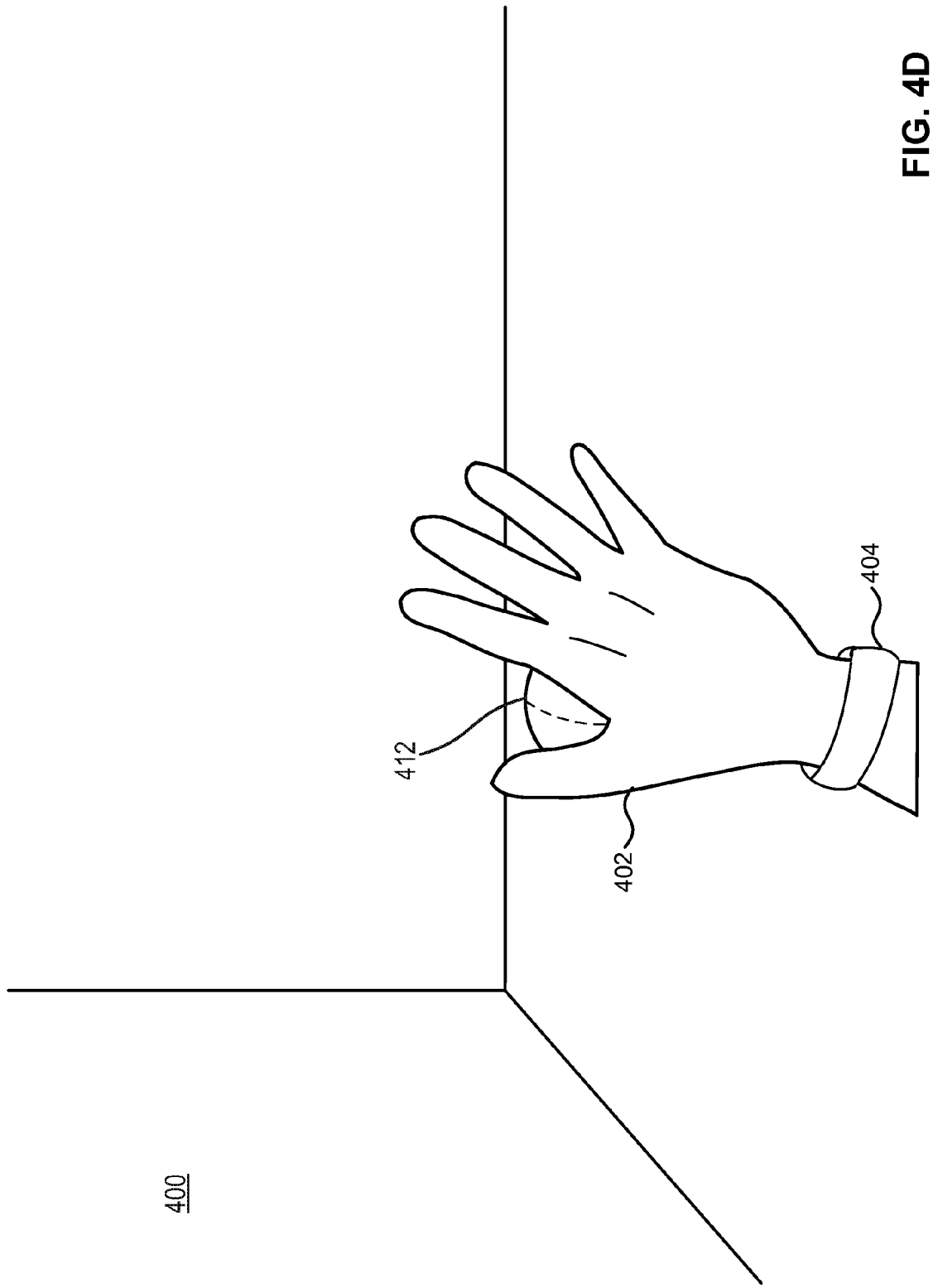

US 9,367,136 B2

HOLOGRAPHIC OBJECT FEEDBACK

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system typically performs several tasks including mapping and localization. Mapping relates to the process of generating a map of a real-world environment. Localization relates to the process of locating a particular point of view or pose relative to the map of the real-world environment. In some cases, an AR system may localize the pose of a mobile device moving within a real-world environment in real-time in order to determine the particular view associated with the mobile device that needs to be augmented as the mobile device moves within the real-world environment.

SUMMARY

Technology is described for providing intelligent feedback to an end user of a mobile device as they are interacting with or controlling one or more virtual objects within an augmented reality environment. The feedback may comprise visual feedback, audio feedback, and/or haptic feedback. In some embodiments, a mobile device, such as a head-mounted display device (HMD), may determine an object classification associated with a virtual object within an augmented reality environment, detect an object manipulation gesture performed by an end user of the mobile device, detect an interaction with the virtual object based on the object manipulation gesture, determine a magnitude of a virtual force associated with the interaction, and provide real-time feedback to the end user of the mobile device based on the interaction, the magnitude of the virtual force applied to the virtual object, and the object classification associated with the virtual object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4D depicts one embodiment of an augmented reality environment as viewed using an HMD, wherein a virtual object is displayed such that it appears to be occluded by a hand.

DETAILED DESCRIPTION

Figure 1:
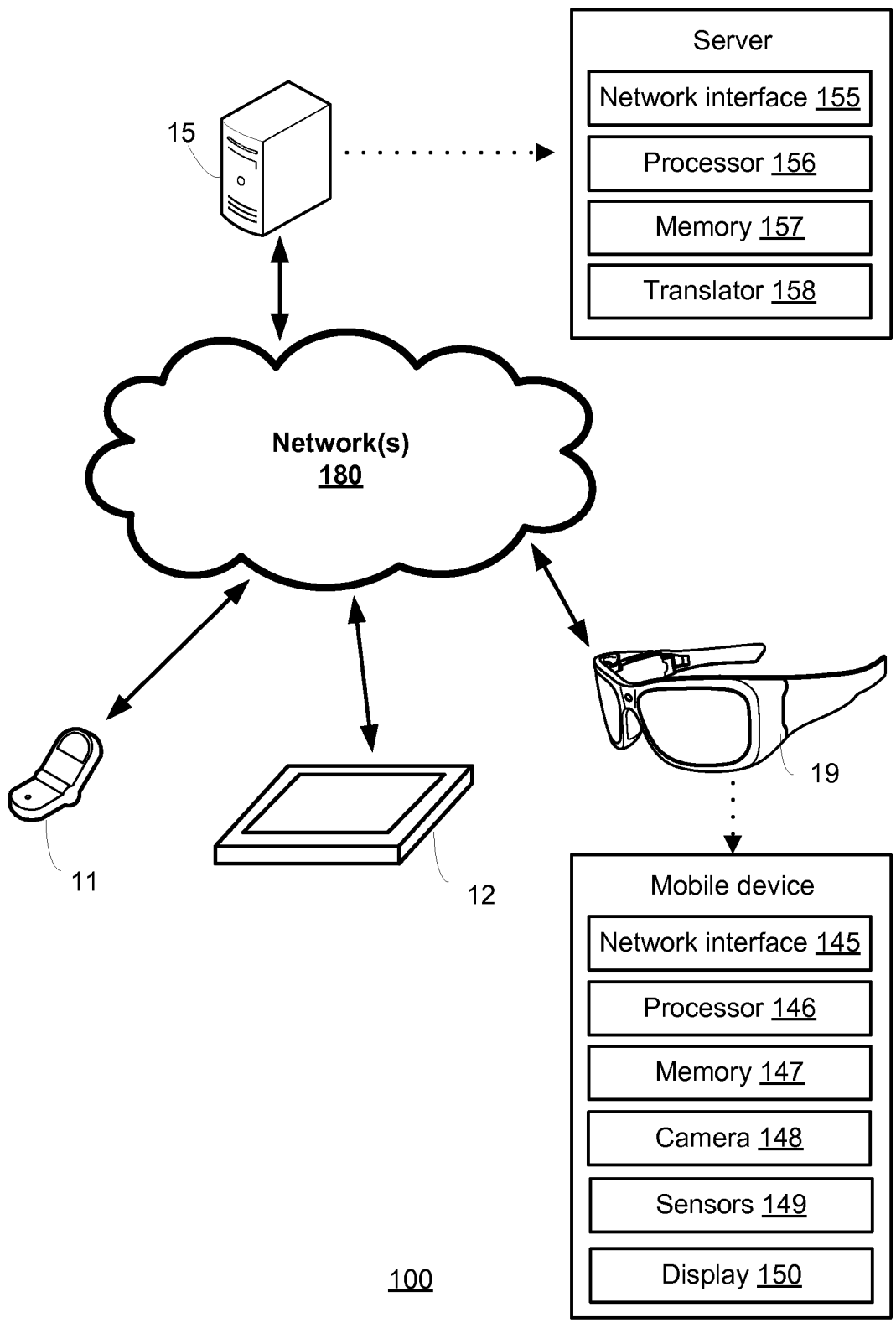
FIG. 1 is a block diagram of one embodiment of a networked computing environment in which the disclosed technology may be practiced.

Technology is described for providing real-time feedback to an end user of a mobile device as they are interacting with or manipulating one or more virtual objects within an augmented reality environment. The real-time feedback may comprise visual feedback, audio feedback, and/or haptic feedback. In some embodiments, a mobile device, such as a head-mounted display device (HMD), may determine an object classification associated with a virtual object within an augmented reality environment, detect an object manipulation gesture performed by an end user of the mobile device, detect an interaction with the virtual object based on the object manipulation gesture, determine a magnitude of a virtual force associated with the interaction, and provide real-time feedback to the end user of the mobile device based on the interaction, the magnitude of the virtual force applied to the virtual object, and the object classification associated with the virtual object.

In some embodiments, an HMD projecting an augmented reality environment to an end user of the HMD may apply gesture recognition and hand tracking techniques to images captured by the HMD in order to detect hand-to-object gestures performed by the end user for controlling a virtual object within the augmented reality environment. The end user may control a virtual object in various ways such as using their hands or a hand-held object such as a stylus or tweezers (which may be used to grab and rotate the virtual object). The detected gestures may correspond with various virtual interactions with the virtual object such as a virtual grab of the virtual object, a virtual move or rotation of the virtual object, a release of the virtual object after grabbing the virtual object, or a virtual bumping of the virtual object. In response to detecting and identifying a particular interaction with a virtual object, the HMD may cause the end user to experience real-time visual, audio, and haptic feedback based on a degree of virtual force applied to the virtual object and/or material properties associated with the virtual object.

In one example, a virtual object may comprise a virtual metal ball and as the end user virtually grabs and rotates the virtual metal ball, the HMD may cause the end user to experience haptic feedback (e.g., a vibration of an electronic wristband or mobile phone at a particular frequency and magnitude), audio feedback (e.g., a low-volume metallic clicking sound), and visual feedback (e.g., if the end user has grabbed the virtual metal ball with their palm facing away from the HMD, then portions of the virtual metal ball that would be occluded by the end user's hand may not be displayed to the end user). In some cases, when the end user has grabbed a virtual object with their palm facing away from the HMD, then the virtual object may be shifted slightly in its position within the augmented reality environment such that the virtual object is not completely covered by the end user's hand (e.g., the position of the virtual object may be shifted and a portion of the virtual object may be displayed such that the portion appears between a thumb and index finger of the end user's hand).

In some embodiments, the appropriate feedback response may be determined via a feedback mapping file. The feedback mapping file may include mappings of feedback responses to various interactions involving a virtual object. The mappings may be for specific virtual objects (e.g., each virtual object may have customized feedback responses) or for classifications of virtual objects (e.g., a first classification for virtual objects comprising wooden objects, a second classification for virtual objects comprising metal objects, and a third classification for virtual objects comprising virtual living creatures). The use of virtual object classification mappings allows virtual objects associated with a particular classification to have similar and consistent feedback responses (i.e., the end user may receive the same visual, audio, and haptic feedback across different virtual objects with common properties).

One issue with interacting with virtual objects within an augmented reality environment is that, unlike interacting with real-world objects, tactile feedback is not inherently provided by virtual objects in order to reinforce an intended interaction. Moreover, an end user of an HMD may expect that interactions with similar virtual objects provide consistent or similar feedback when being interacted with. Thus, there is a need to provide real-time and consistent feedback to an end user of an HMD as they are interacting with or manipulating one or more virtual objects within an augmented reality environment.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file may be a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images. Sensors 149 may generate motion and/or orientation information associated with mobile device 19. In some cases, sensors 149 may comprise an inertial measurement unit (IMU). Display 150 may display digital images and/or videos. Display 150 may comprise a see-through display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment to an end user of the HMD (e.g., for controlling applications running on the HMD). The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the one or more virtual objects may be manipulated or controlled by an end user of the mobile device using hand and/or finger gestures.

In some embodiments, a mobile device, such as mobile device 19, may provide an augmented reality environment to an end user of the HMD and apply gesture recognition and/or hand tracking techniques to images captured by the HMD in order to detect gestures performed by the end user for manipulating one or more virtual objects within the augmented reality environment. The detected gestures may correspond with various virtual interactions with virtual objects such as a virtual grab of a virtual object, a virtual move of a virtual object, a virtual rotation of a virtual object, a release of a virtual object after grabbing the virtual object, or a virtual bumping of a virtual object. In response to detecting and identifying a particular interaction with a virtual object, the HMD may cause the end user to experience real-time visual, audio, and haptic feedback determined based on a degree of virtual force applied to the virtual object and/or material properties associated with the virtual object. In some cases, the real-time feedback provided to the end user of the HMD may be similar and consistent for virtual objects with a common classification (e.g., a virtual wooden object or a virtual metallic object) or with common object properties (e.g., similar sizes, shapes, and/or colors).

Figure 2A:
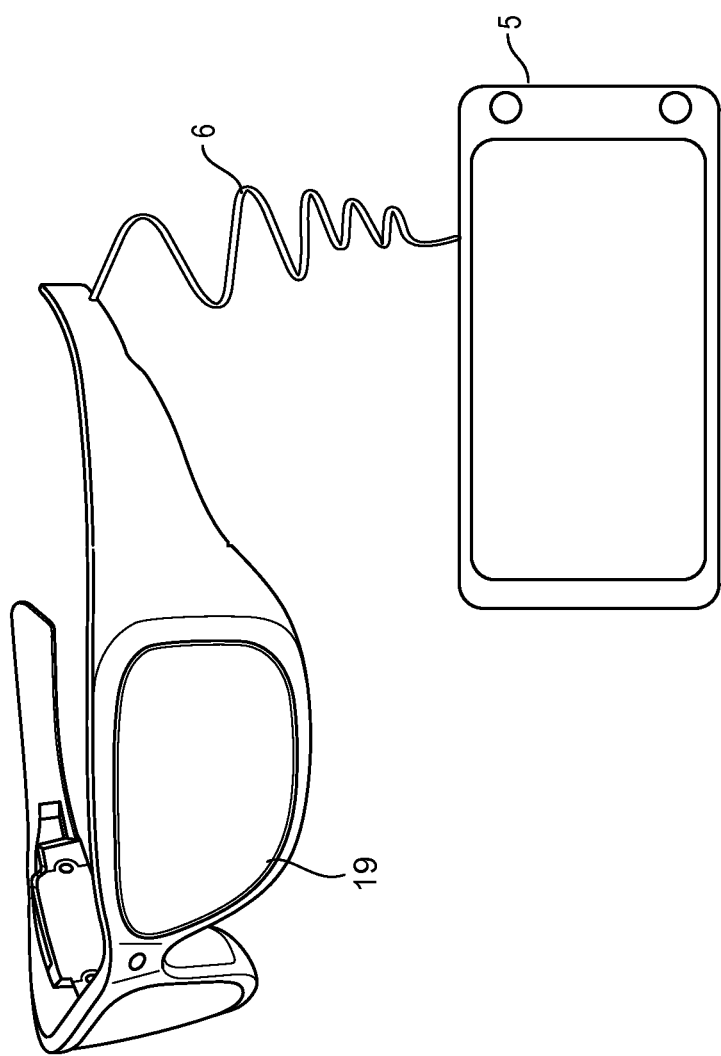
FIG. 2A depicts one embodiment of a mobile device in communication with a second mobile device.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. In one example, an HMD worn by an end user of the HMD may wirelessly communicate with a second mobile device (e.g., a mobile phone used by the end user) within a proximity of the end user (e.g., the second mobile device may be in a coat pocket). Mobile device 5 may be used by mobile device 19 in order to offload compute intensive processing tasks (e.g., the rendering of virtual objects and/or the recognition of gestures) and to store information (e.g., models of virtual objects) that may be used to provide an augmented reality environment on mobile device 19 (e.g., used by the end user for controlling applications running on the mobile device). Mobile device 19 may provide motion and/or orientation information associated with mobile device 19 to mobile device 5. In one example, the motion information may include a velocity or acceleration associated with the mobile device 19 and the orientation information may include Euler angles, which provide rotational information around a particular coordinate system or frame of reference. In some cases, mobile device 19 may include a motion and orientation sensor, such as an inertial measurement unit (IMU), in order to acquire motion and/or orientation information associated with mobile device 19.

Figure 2B:
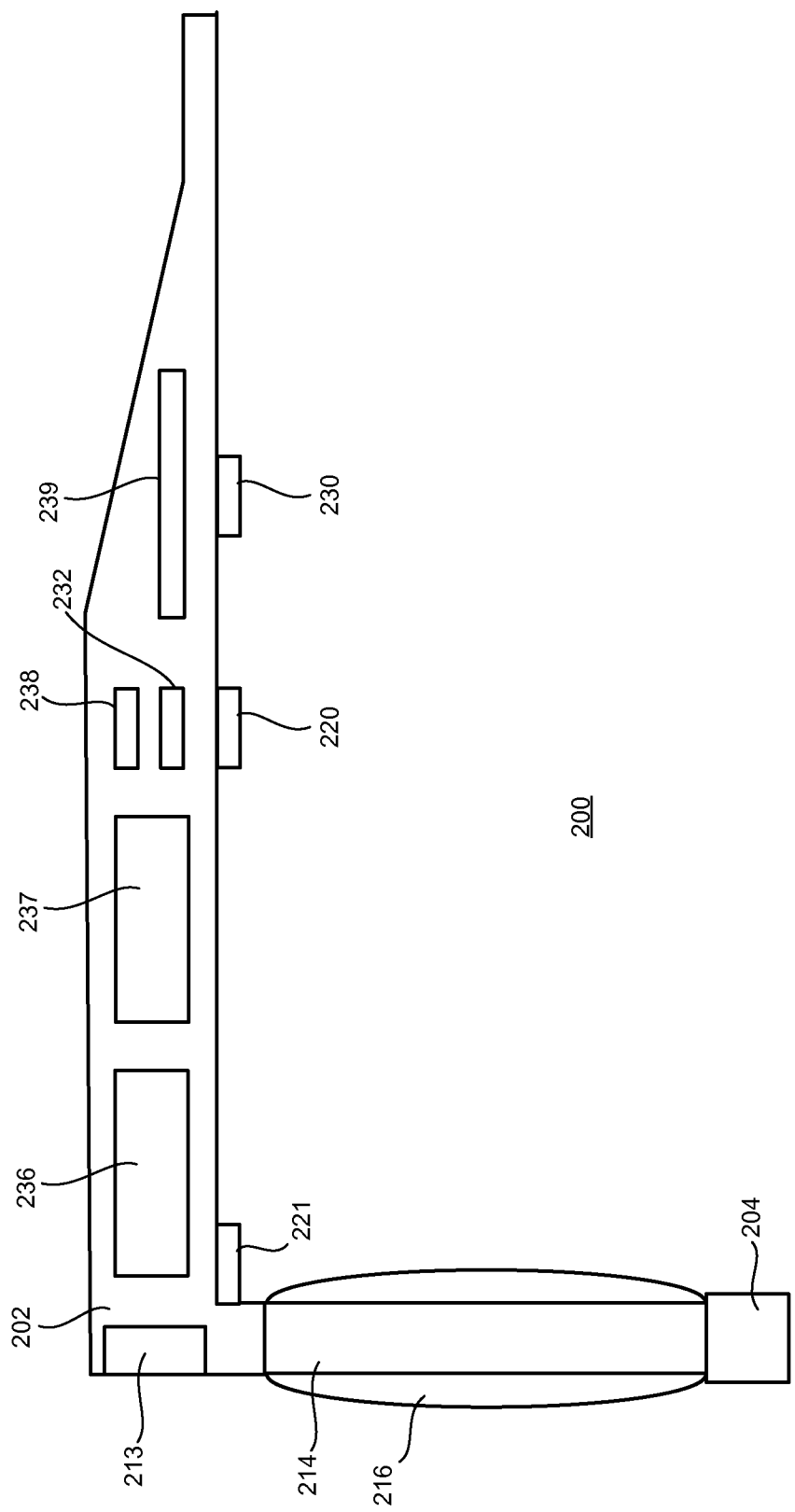
FIG. 2B depicts one embodiment of a portion of an HMD.

FIG. 2B depicts one embodiment of a portion of an HMD, such as mobile device 19 in FIG. 1. Only the right side of an HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The one or more cameras may include one or more image sensors (e.g., a CCD image sensor or a CMOS image sensor). The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include an inward facing camera. In another embodiment, the eye tracking system 221 may comprise an eye tracking illumination source and an associated eye tracking IR sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 3:
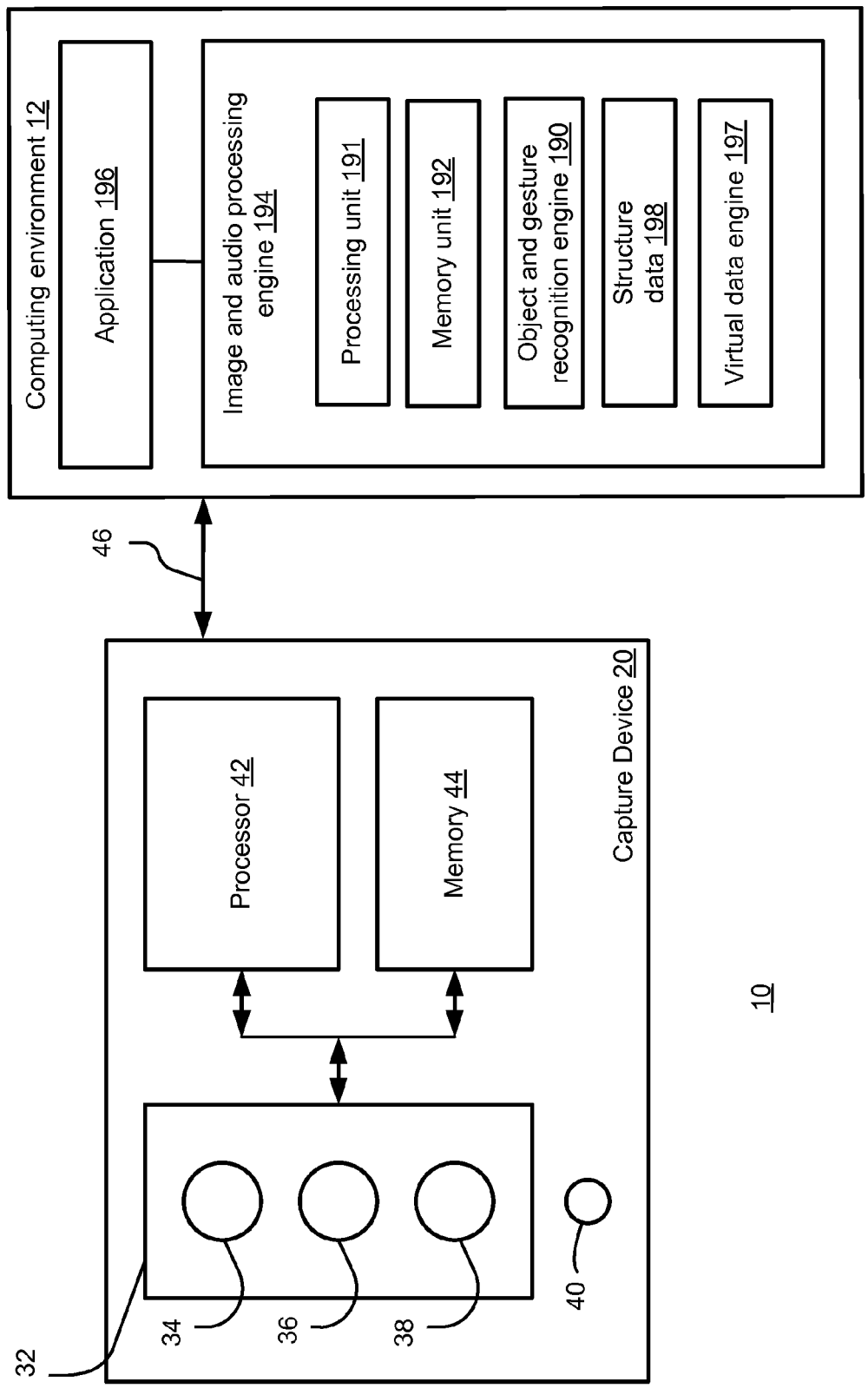
FIG. 3 depicts one embodiment of a mobile device including a capture device and computing environment.

FIG. 3 depicts one embodiment of a computing system 10 including a capture device 20 and computing environment 12. In some embodiments, capture device 20 and computing environment 12 may be integrated within a single mobile computing device. The single integrated mobile computing device may comprise a mobile device, such as mobile device 19 in FIG. 1. In one example, the capture device 20 and computing environment 12 may be integrated within an HMD. In other embodiments, capture device 20 may be integrated with a first mobile device, such as mobile device 19 in FIG. 2A, and computing environment 12 may be integrated with a second mobile device in communication with the first mobile device, such as mobile device 5 in FIG. 2A.

In one embodiment, the capture device 20 may include one or more image sensors for capturing images and videos. An image sensor may comprise a CCD image sensor or a CMOS image sensor. In some embodiments, capture device 20 may include an image sensor and/or an IR CMOS image sensor. The capture device 20 may include an image camera component 32. The image camera component 32 may include an IR light component 34, a depth camera 36, and an RGB camera 38 that may be used to capture the depth image of a capture area. In one example, the IR light component 34 of the capture device 20 may emit an infrared light into the capture area and may then use sensors to detect the backscattered light from the surface of one or more objects in the capture area using the color and/or IR light sensing components within the image camera component 32. In some embodiments, pulsed infrared light may be used such that the time between an outgoing light pulse and a corresponding incoming light pulse may be measured and used to determine a physical distance from the capture device 20 to a particular location on the one or more objects in the capture area. Capture device 20 may also include optics for producing collimated light and/or for diffusing light (e.g., an optical diffuser for spreading light from an IR light source that generates a narrow beam of light) for illuminating an environment.

As depicted in FIG. 3, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor 42 may include a standardized processor, a specialized processor, a microprocessor, or the like. The processor 42 may execute instructions that may include instructions for receiving and analyzing images and/or determining whether a particular gesture has occurred (e.g., end user gestures for controlling or manipulating a virtual object). It is to be understood that at least some image analysis and/or gesture recognition operations may be executed by processors contained within one or more capture devices such as capture device 20.

The capture device 20 may include a memory 44 that may store the instructions that may be executed by the processor 42 and images (or frames of images) captured by the light sensing components of the image camera component 32. In one example, the memory 44 may include random access memory (RAM), read only memory (ROM), cache, Flash memory, a non-volatile memory, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection or a wireless connection such as a wireless 802.11b, g, a, or n connection. In one embodiment, the capture device 20 may provide the images captured by, for example, the depth camera 36 and/or the RGB camera 38 to the computing environment 12 via the communication link 46.

As depicted in FIG. 3, computing environment 12 includes image and audio processing engine 194 in communication with application 196. Application 196 may comprise an operating system application or other computing application such as a gaming application, a messaging application, or an application for generating an augmented reality environment. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190.

Virtual data engine 197 processes virtual objects and registers the position and orientation of virtual objects in relation to various maps of a real-world environment stored in memory unit 192. The virtual data engine may also render images associated with virtual objects for display to an end user of computing system 10. In some embodiments, the computing system 10 may use images acquired from the capture device 20 to determine a six degree of freedom (6DOF) pose corresponding with the images relative to a 3D map of an environment. In one example, a 6DOF pose may comprise information associated with the position and orientation of a mobile device (e.g., an HMD) within the environment. The 6DOF pose may be used for localizing a mobile device and to generate images of virtual objects such that the virtual objects appear to exist at appropriate locations within an augmented reality environment. More information regarding determining a 6DOF pose can be found in U.S. patent application Ser. No. 13/152,220, "Distributed Asynchronous Localization and Mapping for Augmented Reality," incorporated herein by reference in its entirety. More information regarding performing pose estimation and/or localization for a mobile device can be found in U.S. patent application Ser. No. 13/017,474, "Mobile Camera Localization Using Depth Maps," incorporated herein by reference in its entirety.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., a pencil held by an end user of an HMD) and facial recognition may be used to detect the face of a particular person within an environment. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structural data 198 while performing object recognition. Structure data 198 may include structural information about targets and/or objects to be tracked. For example, a skeletal model of a human may be stored to help recognize body parts (e.g., arms, hands, and/or fingers). In another example, structure data 198 may include structural information regarding one or more inanimate objects in order to help recognize the one or more inanimate objects (e.g., a pencil or stylus).

The image and audio processing engine 194 may also utilize object and gesture recognition engine 190 while performing gesture recognition. In one example, object and gesture recognition engine 190 may include a collection of gesture filters, each comprising information concerning a gesture that may be performed. The object and gesture recognition engine 190 may compare the data captured by capture device 20 to the gesture filters in a gesture library to identify when a user has performed one or more gestures. In one example, image and audio processing engine 194 may use the object and gesture recognition engine 190 to detect the performance of a particular gesture performed by an end user of the computing system 10 (e.g., a gesture to manipulate or control virtual objects within an augmented reality environment). In one embodiment, the object and gesture recognition engine 190 may utilize machine learning classification techniques.

FIGS. 4A-4D depict various embodiments of various virtual object interactions (or interactions) with a virtual object. The virtual object may be generated and displayed within an augmented reality environment based on a three-dimensional model of the virtual object. The three-dimensional model of the virtual object may specify the dimensions and shape of the virtual object. The three-dimensional model of the virtual object may also include various properties associated with the virtual object, such as a virtual weight, a virtual material (e.g., wood, metal, or plastic), a virtual color and corresponding degree of transparency, and a virtual smell.

Figure 4A:
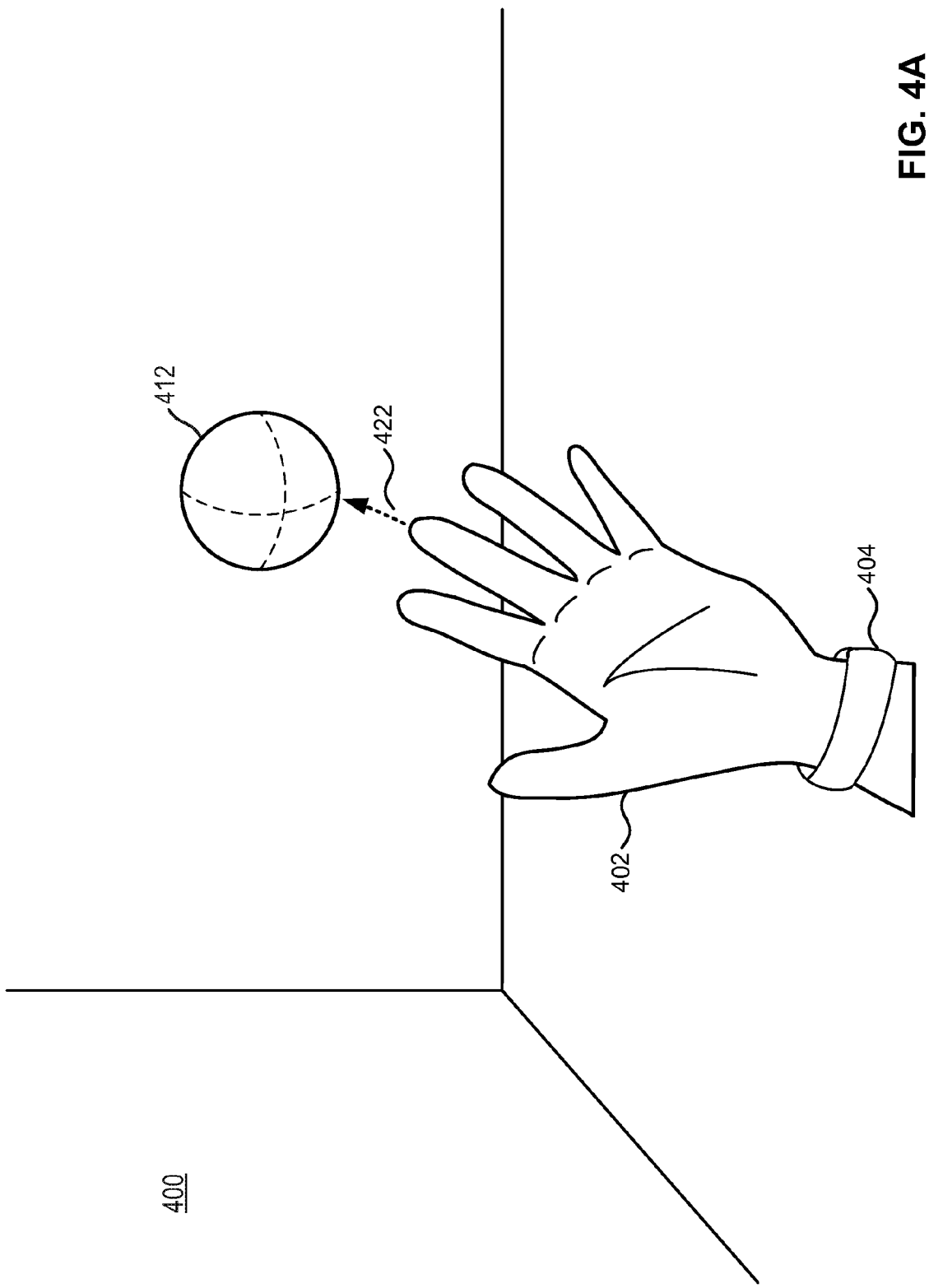
FIG. 4A depicts one embodiment of an augmented reality environment as viewed using an HMD, wherein a virtual bump gesture is performed.

FIG. 4A depicts one embodiment of an augmented reality environment 400 as viewed using an HMD, wherein a virtual bump gesture is performed. As depicted, the augmented reality environment 400 includes a virtual ball 412 (i.e., a virtual object) and a hand 402 (i.e., a real-world object) of an end user of the HMD. The end user of the HMD may wear an electronic wristband 404 which may be used to provide haptic feedback to the end user such as a vibrating sensation of a particular frequency and magnitude or a tightening sensation (or constricting sensation) of a particular degree. An electronic watch and/or electronic armband may also be worn by the end user of the HMD for providing real-time haptic feedback to the end user. In this case, the end user of the HMD (or another person within the augmented reality environment 400) may perform a gesture that corresponds with a bumping motion gesture 422 applied to the virtual ball 412. The bumping motion gesture 422 (or a hitting gesture) may redirect or alter the position of the virtual ball 412 within the augmented reality environment 400. The bumping motion gesture 422 may correspond with a virtual force applied to the virtual ball 412. The virtual force may be determined based on an acceleration and/or velocity of the hand 402 upon striking or interacting with the virtual ball 412.

In some embodiments, a bumping of a virtual object (e.g., via a bumping motion gesture) may be reinforced by a playing of a scaled-volume sound effect proportional to the amount of virtual force applied to the virtual object. The sound effect may also correspond with a material property of the virtual object. For example, if the virtual object comprises a virtual metal object, then a metallic sound associated with metallic objects may be played. If the virtual object comprises a wooden virtual object, then a low wooden sound associated with wooden objects may be played to the end user of the HMD. A bumping of the virtual object may also be reinforced by displaying a virtual settling of dust around the point of collision with the virtual object. The amount of virtual dust may be proportional to the virtual force applied to the virtual object.

Figure 4B:
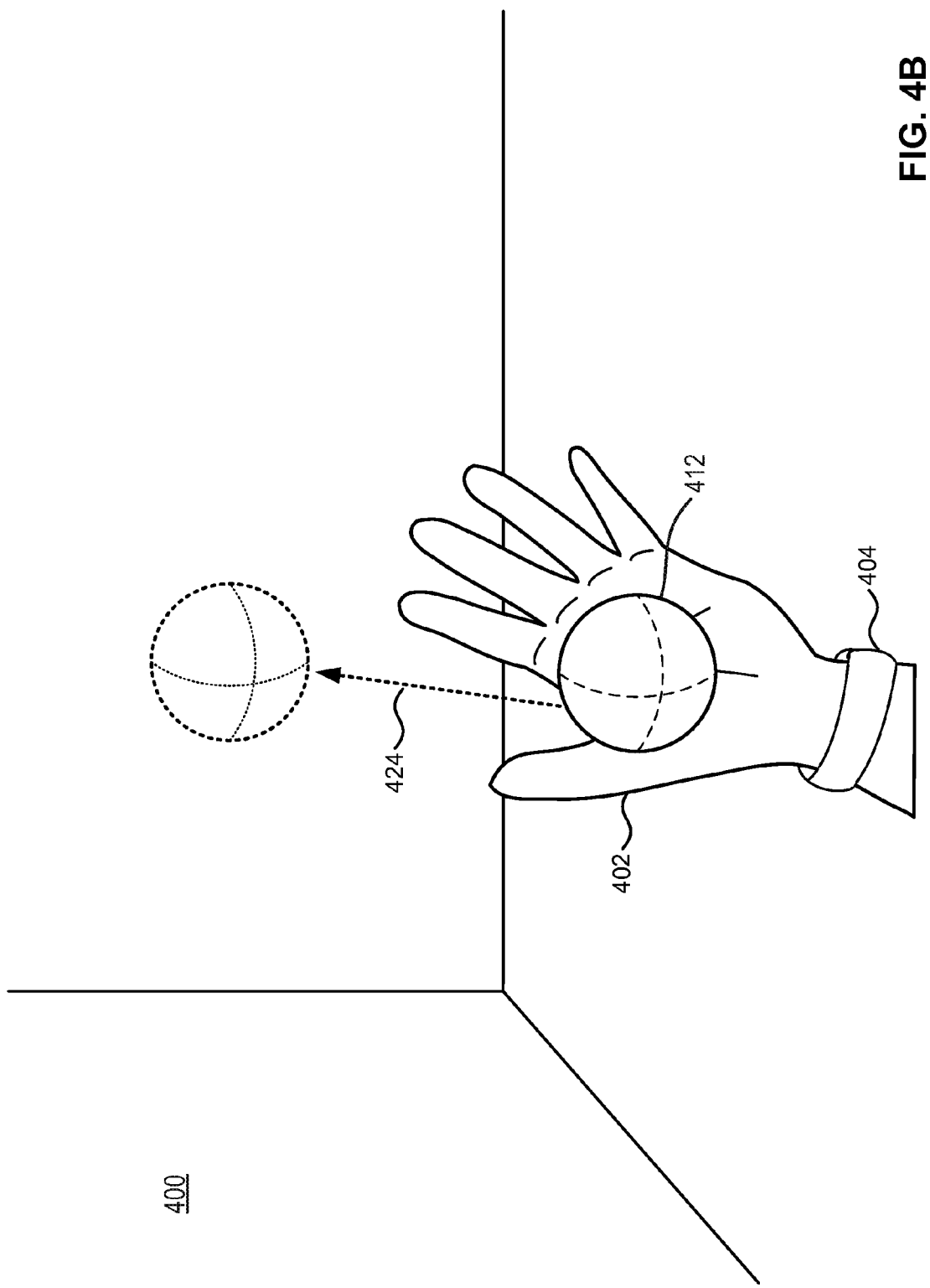
FIG. 4B depicts one embodiment of an augmented reality environment as viewed using an HMD, wherein a virtual grab and move gesture is performed.

FIG. 4B depicts one embodiment of an augmented reality environment 400 as viewed using an HMD, wherein a virtual grab and move gesture is performed. As depicted, the augmented reality environment 400 includes a virtual ball 412 (i.e., a virtual object) and a hand 402 (i.e., a real-world object) of an end user of the HMD. The end user of the HMD may wear an electronic wristband 404 which may be used to provide haptic feedback to the end user such as a vibrating sensation of a particular frequency and magnitude or a tightening sensation of a particular degree. In this case, the end user of the HMD (or another person within the augmented reality environment 400) may perform one or more gestures that correspond with a virtual grabbing and moving gesture 424 applied to the virtual ball 412. The virtual grabbing and moving gesture 424 may move the virtual ball 412 to a new location within the augmented reality environment 400. In one embodiment, the virtual ball 412 may snap to a center of the end user's hand and appear to move with the end user's hand within the augmented reality environment. The virtual grabbing and moving gesture 424 may correspond with a virtual force applied to the virtual ball 412. The virtual force may be determined based on an acceleration and/or velocity of the hand 402 upon virtually grabbing and then moving the virtual ball 412.

In one embodiment, an end user of an HMD may perform a grabbing gesture within a region of the augmented reality environment in which a virtual object exists. Upon detection of the grabbing gesture, the virtual object may be snapped to a center of the end user's hand. The performance of a grabbing gesture may allow the end user to engage the virtual object or to take control of the virtual object. Moreover, snapping the virtual object to the center of the end user's hand may ensure that rotations of the virtual object feel correct to the end user (e.g., as the end user's hand rotates, the rotation applied to the virtual object may match the actual rotations that the end user thinks they are applying to the virtual object). Once the virtual object has been virtually grabbed, then the virtual object may be moved within the augmented reality environment until a virtual object release gesture is performed. The virtual object release gesture may release the virtual object from the end user's control. In one example, a grabbing gesture may comprise a hand gesture in which the end user's thumb and fingers move towards each other in a grabbing motion and a release gesture may comprise a hand gesture in which the end user's thumb and fingers move back into a natural straight hand position (e.g., a relaxing of the hand from a clenched hand position).

In some embodiments, a grabbing of a virtual object (e.g., via a virtual grabbing gesture) may be reinforced by playing a sound with increasing pitch. As the grabbing of a virtual object and the releasing of a virtual object are opposing or inverse actions, feedback associated with grab gestures and release gestures may be paired and feedback symmetries may be used. In one example, a sound with increasing pitch may be used for a virtual grabbing gesture, while a sound with a decreasing pitch may be used for a virtual releasing gesture. In another example, a constant low vibration may be used for a virtual grabbing gesture, while a disabling of the constant low vibration may be used for a virtual releasing gesture.

In some embodiments, a virtual grabbing gesture may be reinforced by displaying the virtual object subject to an orientation of the end user's hand. For example, if the end user's hand is oriented such that their palm is facing away from the HMD (or away from the end user's body), then portions of the virtual object that would be naturally masked by the end user's hand may be removed (e.g., rendered pixels corresponding with portions of the virtual object occluded by the end user's hand or forearm may be removed), thereby providing the appearance that the virtual object is in the hand of the end user. This "hand occlusion" technique may simulate the real world behavior of an object that would be partially or completely obstructed by the end user's hand. In some cases, upon the detection of a grabbing gesture, the virtual object may be highlighted, pulsed with a glowing color, or have a virtual wireframe superimposed over the virtual object. A grabbing gesture may also be reinforced by providing a pulsed vibration to an electronic wristband, such as electronic wristband 404, worn by the end user.

Figure 4C:
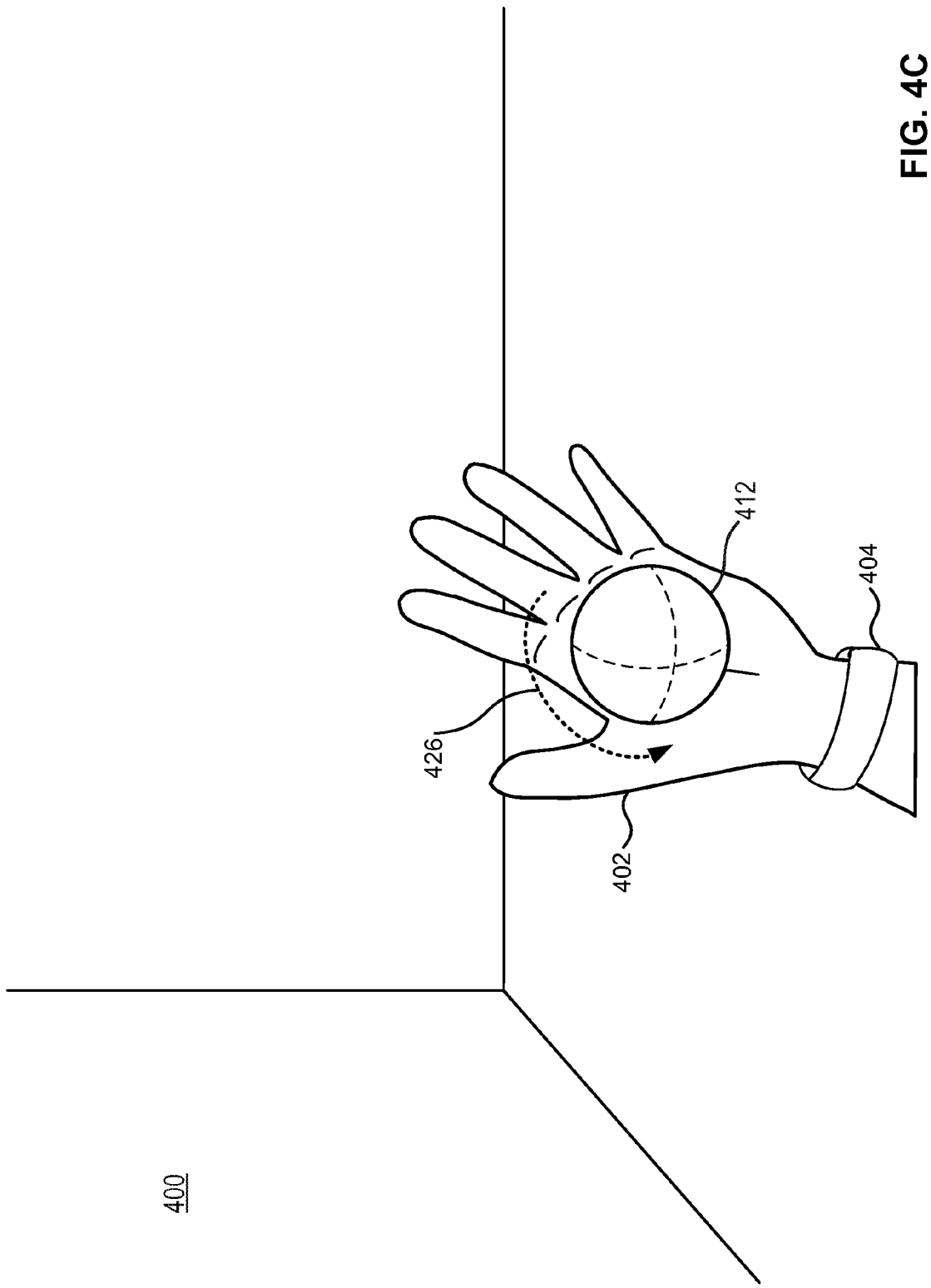
FIG. 4C depicts one embodiment of an augmented reality environment as viewed using an HMD, wherein a virtual rotation gesture is performed.

FIG. 4C depicts one embodiment of an augmented reality environment 400 as viewed using an HMD, wherein a virtual rotation gesture is performed. As depicted, the augmented reality environment 400 includes a virtual ball 412 (i.e., a virtual object) and a hand 402 (i.e., a real-world object) of an end user of the HMD. The end user of the HMD may wear an electronic wristband 404 which may be used to provide haptic feedback to the end user such as a vibrating sensation of a particular frequency and magnitude or a tightening sensation of a particular degree. In this case, the end user of the HMD (or another person within the augmented reality environment 400) may perform one or more gestures that correspond with a virtual rotation gesture 426 applied to the virtual ball 412. The virtual rotation gesture 426 may rotate the virtual ball 412 within the augmented reality environment 400. In one embodiment, the virtual ball 412 may snap to a center of the end user's hand and appear to rotate relative to a rotation of the end user's hand within the augmented reality environment. The virtual rotation gesture 426 may correspond with a virtual force applied to the virtual ball 412 that is proportional to the speed at which the virtual ball 412 is virtually rotated by a rotation of the end user's hand. In some cases, the virtual force applied to a virtual object may be determined by taking into account the speeds associated with the end user's forearm, hand, wrist, and fingers while the end user is performing a virtual object interaction gesture. For example, the rotation of a virtual object and the corresponding virtual force applied to the virtual object may depend on both wrist motions and fingertip motions used by the end user.

In some embodiments, a rotation of a virtual object (e.g., via a virtual rotation gesture) may be reinforced by the playing of a low-volume clicking sound as the virtual object is rotated. The low-volume clicking sound may mimic sounds familiar to the end user when rotating crank and knob objects. The virtual rotation of the virtual object may also be reinforced by causing the end user to experience (or feel) short vibration pulses in sync with the audio clicking feedback.

FIG. 4D depicts one embodiment of an augmented reality environment 400 as viewed using an HMD, wherein a virtual object is displayed such that it appears to be occluded by a hand. As depicted, the augmented reality environment 400 includes a virtual ball 412 (i.e., a virtual object) and a hand 402 (i.e., a real-world object) of an end user of the HMD. The end user of the HMD may wear an electronic wristband 404 which may be used to provide haptic feedback to the end user such as a vibrating sensation of a particular frequency and magnitude or a tightening sensation of a particular degree. In this case, the end user of the HMD has performed a grabbing gesture or has otherwise taken control of the virtual ball 412. As depicted, the position of the virtual ball 412 within the augmented reality environment has been shifted such that only a portion of the virtual ball 412 is visible to the end user of the HMD (i.e., only a portion of the virtual ball 412 is displayed between the end user's thumb and fingers).

Figure 5A:
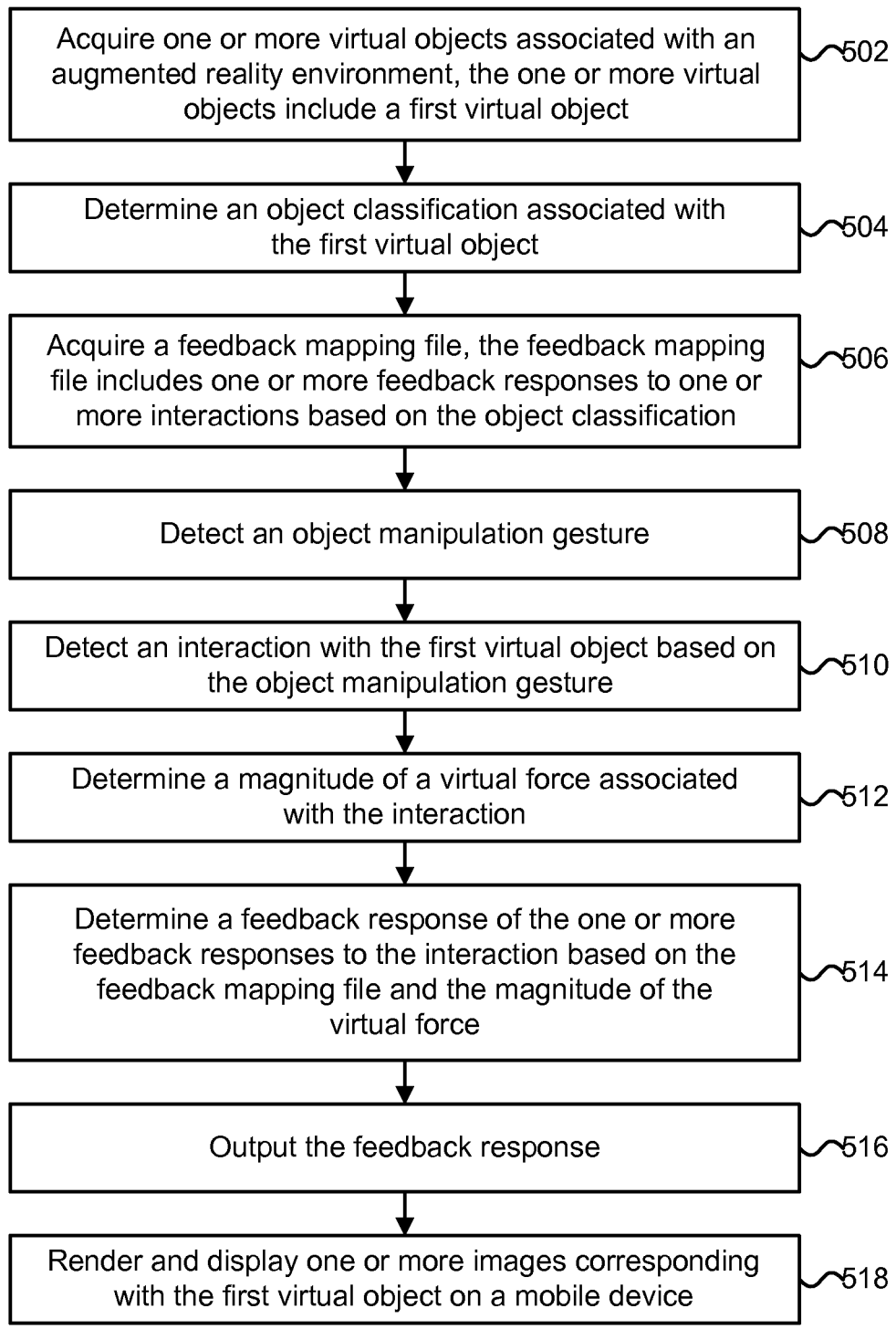
FIG. 5A is a flowchart describing one embodiment of a method for providing real-time feedback to an end user of a mobile device as the end user manipulates virtual objects within an augmented reality environment.

FIG. 5A is a flowchart describing one embodiment of a method for providing real-time feedback to an end user of a mobile device as the end user manipulates virtual objects within an augmented reality environment. In one embodiment, the process of FIG. 5A may be performed by a mobile device, such as mobile device 19 in FIG. 1.

In step 502, one or more virtual objects associated with an augmented reality environment are acquired. The one or more virtual objects may be acquired from a virtual object server, such as server 15 in FIG. 1. The one or more virtual objects may comprise virtual objects that have already been placed or exist within the augmented reality environment. The one or more virtual objects may include a first virtual object. In one embodiment, the first virtual object comprises a three-dimensional virtual ball, such as the virtual ball 412 in FIG. 4A.

In step 504, an object classification associated with the first virtual object is determined. The object classification may comprise the best-fit or closest matching classification of a plurality of virtual object classifications. The plurality of virtual object classifications may allow numerous virtual objects to be categorized according to similar virtual object attributes or properties. In one example, all virtual objects associated with a particular virtual object material, a particular virtual object shape, a particular virtual object computing application, or that are greater than or less than a particular virtual object size may be assigned the same virtual object classification. For example, the plurality of virtual object classifications may include a first classification for virtual objects comprising wooden objects and a second classification for virtual objects comprising metal objects. The use of virtual object classifications for mapping feedback responses allows virtual objects associated with a common classification to have similar and consistent feedback responses (i.e., the end user may receive consistent feedback across many different virtual objects with common properties).

In step 506, a feedback mapping file is acquired. The feedback mapping file may include one or more feedback responses to one or more interactions based on the object classification. The feedback mapping file may be acquired from a server, such as server 15 and FIG. 1. The one or more feedback responses may comprise visual feedback responses, audio feedback responses, and/or haptic or tactile feedback responses.

In step 508, an object manipulation gesture is detected. In one embodiment, the object manipulation gesture may be detected by applying object recognition and/or gesture recognition techniques to images captured by a mobile device providing the augmented reality environment. In step 510, an interaction with the first virtual object is detected based on the object manipulation gesture. In one embodiment, the interaction may be detected if a particular gesture is performed by an end user of an HMD and the gesture is performed within proximity to the first virtual object. In some cases, the object manipulation gesture may comprise a virtual object grab gesture, a virtual object move gesture, or a virtual object release gesture.

In step 512, a magnitude of a virtual force associated with the interaction is determined. The magnitude of the virtual force may be determined based on (or be proportional to) an acceleration and/or a velocity associated with the object manipulation gesture. For example, a hand gesture made using fast hand movements may correspond with a large magnitude virtual force, while a hand gesture made using slow hand movements may correspond with a small magnitude virtual force.

In step 514, a feedback response of the one or more feedback responses to the interaction is determined based on the feedback mapping file and the magnitude of the virtual force. The feedback response may comprise a combination of visual feedback, audio feedback, and haptic feedback provided to the end user of the HMD. One embodiment of a process for determining a feedback response is described later in reference to FIG. 5C. In step 516, the feedback response is outputted. In step 518, one or more images corresponding with the first virtual object are rendered and displayed on a mobile device. The one or more images corresponding with the first virtual object may be rendered and displayed such that the first virtual object is perceived to exist within an augmented reality environment displayed to the end user of the mobile device.

In some embodiments, a proximity feedback response may be provided to the end user of the HMD as a performed gesture gets within a particular distance of a virtual object. The proximity feedback response may help guide the end user to move their hand to a position of the virtual object within the augmented reality environment. In one example, as the end user's hand approaches the virtual object and gets within the particular distance of the virtual object (e.g., within four inches of the virtual object), audio feedback may start to play that increases in volume or pitch as the end user's hand gets closer to the virtual object. Upon touching the virtual object, a special audio tone may be played to confirm that the end user has virtually touched the virtual object. In another example, as the end user's hand approaches the virtual object and gets within the particular distance of the virtual object (e.g., within six inches of the virtual object), visual feedback such as virtual directional arrows or clouds of moving particles may be displayed in order to provide guidance regarding which direction the end user's hand must move to virtually touch the virtual object. In another example, haptic feedback such as a vibration of an electronic wristband around the wrist of the end user's hand that is within a particular distance of the virtual object may be provided that increases with magnitude and/or frequency as the end user's hand gets closer to the virtual object. Upon touching the virtual object, a special vibration (e.g., a specific high-frequency solid pulse) may be used to confirm that the end user has virtually touched the virtual object.

Figure 5B:
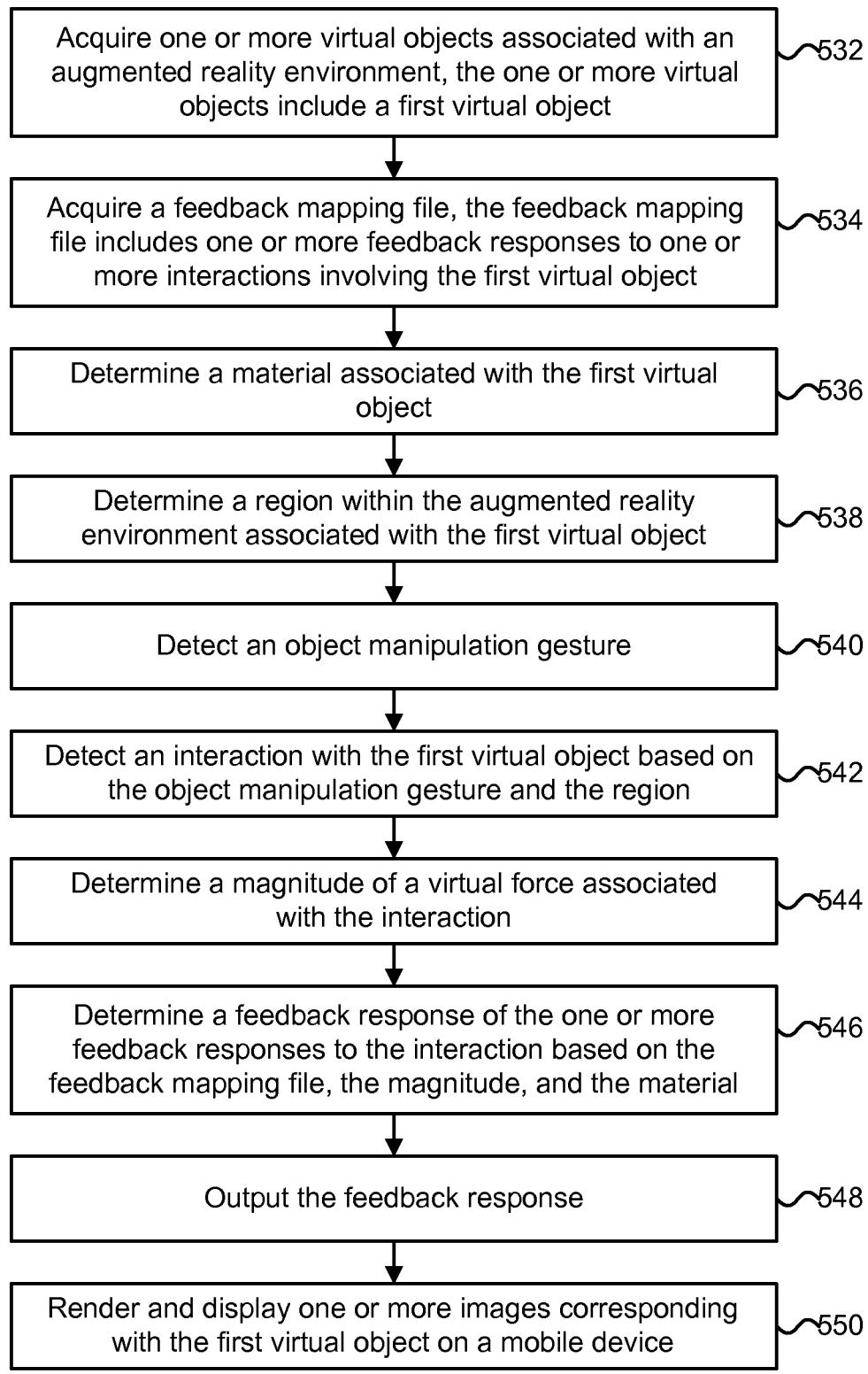
FIG. 5B is a flowchart describing an alternative embodiment of a method for providing real-time feedback to an end user of a mobile device as the end user manipulates virtual objects within an augmented reality environment.

FIG. 5B is a flowchart describing an alternative embodiment of a method for providing real-time feedback to an end user of a mobile device as the end user manipulates virtual objects within an augmented reality environment. In one embodiment, the process of FIG. 5B may be performed by a mobile device, such as mobile device 19 in FIG. 1.

In step 532, one or more virtual objects associated with an augmented reality environment are acquired. The one or more virtual objects may be acquired from a virtual object server, such as server 15 in FIG. 1. The one or more virtual objects may comprise virtual objects that have already been placed within the augmented reality environment. The one or more virtual objects may include a first virtual object. In one embodiment, the first virtual object comprises a three-dimensional virtual ball, such as the virtual ball 412 in FIG. 4A.

In step 534, a feedback mapping file is acquired. The feedback mapping file may include one or more feedback responses to one or more interactions involving the first virtual object. The feedback mapping file may be acquired from a server, such as server 15 and FIG. 1. The one or more feedback responses may comprise visual feedback responses, audio feedback responses, and/or haptic feedback responses.

In step 536, a material associated with the first virtual object is determined. In one embodiment, the material may correspond with a virtual material property. For example, the material may correspond with metal, plastic, glass, or wood. In step 538, a region within the augmented reality environment associated with the first virtual object is determined. The region may correspond with one or more points within the augmented reality environment. In one embodiment, the first virtual object may comprise a virtual ball (or virtual sphere) and the region within the augmented reality environment may correspond with the positions within the augmented reality environment that are occupied by the virtual ball. In some cases, the region may extend beyond those positions occupied by the virtual ball within the augmented reality environment by a particular amount. For example, the region may extend beyond a virtual ball with a circumference of 28 inches by an additional 2 inches. In one embodiment, the region may extend beyond a virtual object by a particular distance that corresponds with a fraction of the total size of the virtual object.

In step 540, an object manipulation gesture is detected. In one embodiment, the object manipulation gesture may be detected by applying object recognition and/or gesture recognition techniques to images captured by a mobile device providing the augmented reality environment. In step 542, an interaction with the first virtual object is detected based on the object manipulation gesture and the region determined in step 538. In some cases, the interaction may be detected if a particular gesture is performed by an end user of an HMD and the gesture is performed within the region associated with the first virtual object. The object manipulation gesture may comprise a virtual object grab gesture, a virtual object move gesture, a virtual object release gesture, or other gesture that triggers an interaction with the first virtual object.

In step 544, a magnitude of a virtual force associated with the interaction is determined. The magnitude of the virtual force may be determined based on (or be proportional to) an acceleration and/or a velocity associated with the object manipulation gesture. For example, a hand gesture made using fast hand movements may correspond with a first magnitude virtual force, while a hand gesture made using slow hand movements may correspond with a second magnitude virtual force that is less than the first magnitude virtual force.

In step 546, a feedback response of the one or more feedback responses to the interaction is determined based on the feedback mapping file, the magnitude of the virtual force, and the material determined in step 536. The feedback response may comprise a combination of visual feedback, audio feedback, and haptic feedback provided to the end user of the HMD. One embodiment of a process for determining a feedback response is described later in reference to FIG. 5C. In step 548, the feedback response is outputted. In step 550, one or more images corresponding with the first virtual object are rendered and displayed on a mobile device. The one or more images corresponding with the first virtual object may be rendered and displayed such that the first virtual object is perceived to exist within an augmented reality environment displayed to the end user of the mobile device.

Figure 5C:
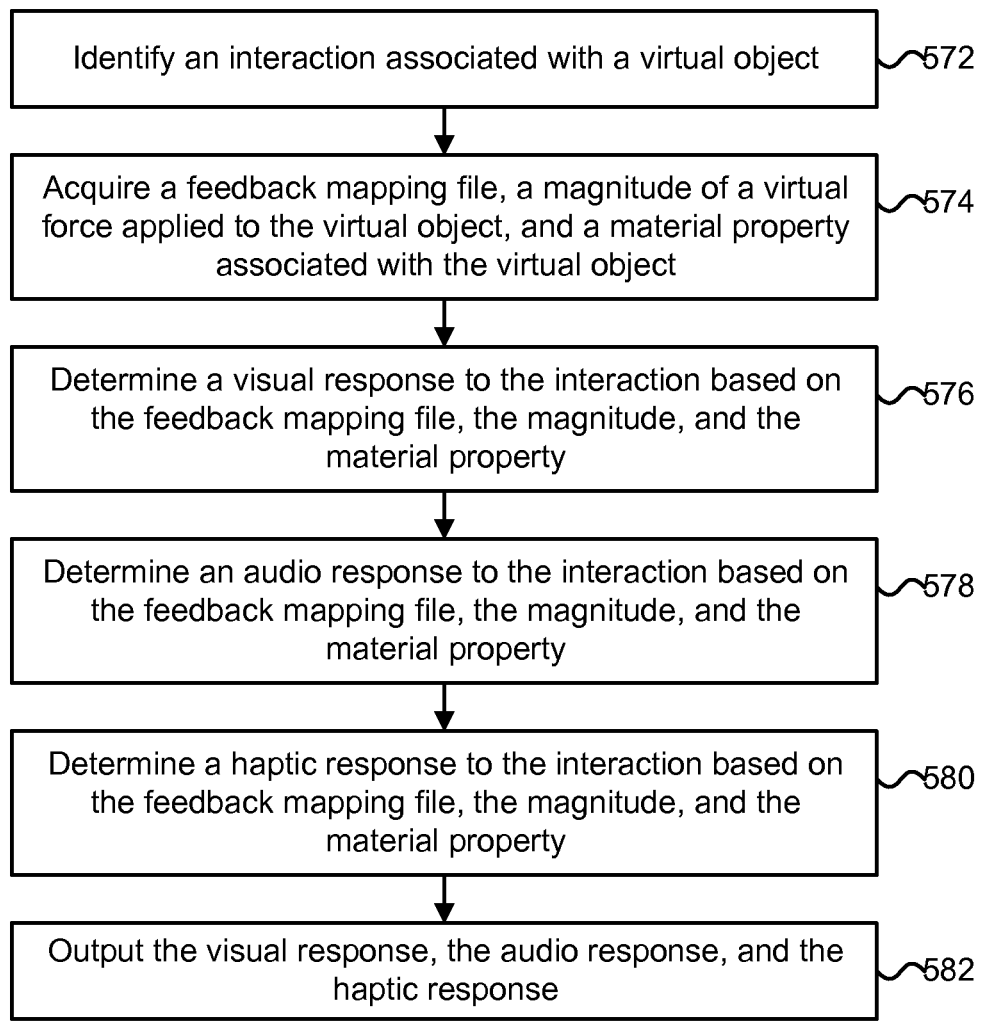
FIG. 5C is a flowchart describing one embodiment of a process for determining a feedback response.

FIG. 5C is a flowchart describing one embodiment of a process for determining a feedback response. The process described in FIG. 5C is one example of a process for implementing step 514 in FIG. 5A or for implementing step 546 in FIG. 5B. In one embodiment, the process of FIG. 5C may be performed by a mobile device, such as mobile device 19 in FIG. 1.

In step 572, an interaction associated with a virtual object is identified. The interaction may comprise an engaging interaction, in which control of the virtual object is obtained and held until a releasing action or disengaging action is performed. The interaction may comprise a grabbing of the virtual object, a moving of the virtual object, or a release of the virtual object. In step 574, a feedback mapping file, a magnitude of a virtual force applied to the virtual object, and a material property associated with the virtual object are acquired.

In step 576, a visual response to the interaction is determined based on the feedback mapping file, the magnitude of the virtual force applied to the virtual object, and the material property. In one embodiment, it is determined whether a hand of an end user of an HMD associated with the interaction is facing away from the HMD (i.e., the end user's palm is facing away from the HMD) prior to determining the appropriate visual response. If the end user's hand is facing away from the HMD during the interaction and the interaction comprises a grabbing gesture, then the position of the virtual object may be shifted within the augmented reality environment such that only a portion of the virtual object is visible to the end user of the HMD (i.e., only a portion of the virtual object is displayed between the end user's thumb and fingers).

In some cases, the visual response may comprise object specific visual feedback such as a blinking of a virtual object after a virtual object grab gesture has been performed on the virtual object. In other cases, the visual response may comprise non-object specific visual feedback such as a screen color change or a change of a background color of an augmented reality environment as viewed using an HMD. A visual indicator associated with a particular virtual object gesture or interaction may also appear within the augmented reality environment to provide feedback to an end user of the HMD (e.g., a virtual object grabbed icon may appear in an upper right corner within a field of view of the HMD).

In step 578, an audio response to the interaction is determined based on the feedback mapping file, the magnitude of the virtual force applied to the virtual object, and the material property. In one embodiment, the audio response may comprise a sound effect associated with the material property. For example, if the material property corresponds with a metallic virtual object, then a metallic sound associated with metallic objects may be played.

In step 580, a haptic response to the interaction is determined based on the feedback mapping file, the magnitude of the virtual force applied to the virtual object, and the material property. In one embodiment, the haptic response may be associated with a vibration of an electronic wristband, such as electronic wristband 404 in FIG. 4A. Moreover, as some virtual object interactions are inherently symmetric, the feedback response provided to the end user may be symmetric. In one embodiment, a grabbing of a virtual object and a releasing of the virtual object may be deemed to be symmetric actions and therefore feedback associated with the grabbing and releasing of the virtual object may be made symmetric. In one example, a sound with increasing pitch may be used for a virtual grabbing gesture, while a sound with a decreasing pitch may be used for a virtual releasing gesture. In another example, a constant low vibration may be used for a virtual grabbing gesture, while a disabling of the constant low vibration may be used for a virtual releasing gesture.

In step 582, the visual response, the audio response, and the haptic response are outputted. In one embodiment, the outputted visual response may comprise an updated display of the virtual object as viewed by an end user of an HMD, the outputted audio response may comprise a playing of particular sounds (e.g., via speakers embedded in the HMD), and the outputted haptic response may comprise a vibration of an electronic wristband, a mobile phone associated with the end user of the HMD, or the HMD itself.

One embodiment of the disclosed technology includes a see-through display in communication with the one or more processors. The one or more processors acquire a first virtual object and determine an object classification associated with the first virtual object, the one or more processors detect an object manipulation gesture performed by an end user of the electronic device and detect an interaction with the first virtual object based on the object manipulation gesture, the one or more processors determine a magnitude of a virtual force associated with the interaction and determine a feedback response to the interaction based on the magnitude of the virtual force and the object classification. The one or more processors output the feedback response. The feedback response may comprise a visual response, an audio response, and a haptic response. The see-through display displays one or more images of the first virtual object such that the first virtual object is perceived to exist within the augmented reality environment.

One embodiment of the disclosed technology includes acquiring one or more virtual objects associated with an augmented reality environment. The one or more virtual objects include a first virtual object. The method further comprises determining an object classification associated with the first virtual object, detecting an object manipulation gesture, detecting an interaction with the first virtual object based on the object manipulation gesture, determining a magnitude of a virtual force associated with the interaction, determining a feedback response to the interaction based on the magnitude of the virtual force and the object classification, and outputting the feedback response. The feedback response may comprise a visual response, an audio response, and a haptic response. The method may further comprise rendering one or more images corresponding with the first virtual object and displaying the one or more images on a mobile device.

One embodiment of the disclosed technology includes acquiring a first virtual object and a second virtual object associated with an augmented reality environment, determining an object classification associated with the first virtual object and the second virtual object, detecting an object manipulation gesture within the augmented reality environment, detecting an interaction with the first virtual object based on the object manipulation gesture, determining a magnitude of a virtual force associated with the interaction, determining a feedback response to the interaction based on the magnitude of the virtual force and the object classification, and outputting the feedback response. The feedback response includes at least one of a visual response, an audio response, or a haptic response. The method further comprises rendering one or more images corresponding with the first virtual object and displaying the one or more images on a mobile device.

Figure 6:
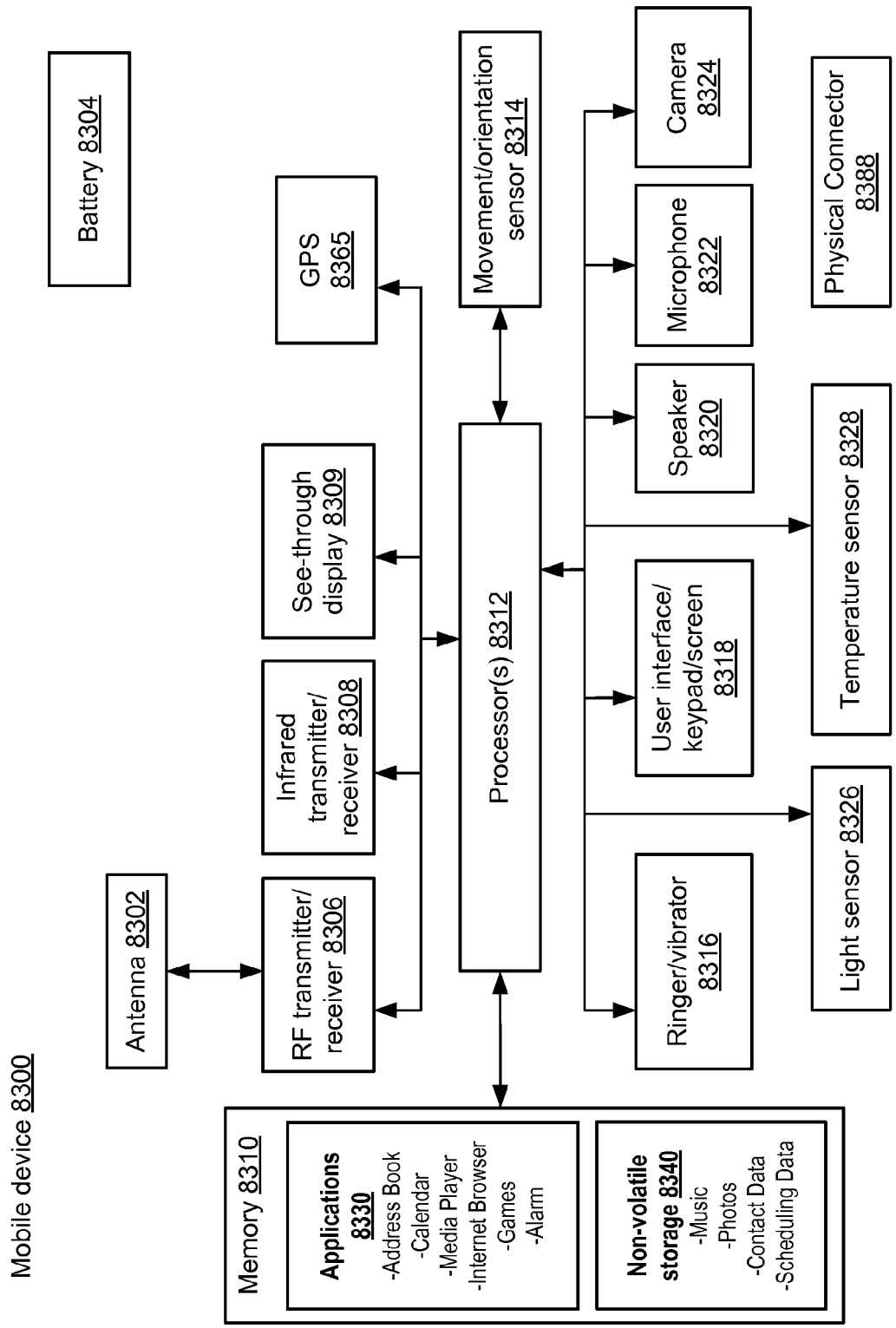
FIG. 6 is a block diagram of one embodiment of a mobile device.

FIG. 6 is a block diagram of one embodiment of a mobile device 8300, such as mobile device 19 in FIG. 1. Mobile devices may include laptop computers, pocket computers, mobile phones, HMDs, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic device for providing feedback associated with virtual object interactions, comprising:
   one or more processors, the one or more processors acquire a first virtual object and determine an object classification associated with the first virtual object, the one or more processors detect an object manipulation gesture performed by an end user of the electronic device and detect an interaction with the first virtual object based on the detection of the object manipulation gesture, the one or more processors determine a magnitude of a virtual force associated with the interaction, the one or more processors determine a feedback response to the interaction based on the magnitude of the virtual force and the object classification, the one or more processors output the feedback response, the one or more processors detect that a palm of the end user's hand is facing away from the electronic device, the one or more processors render one or more images corresponding with the first virtual object such that a first portion of the first virtual object is rendered and a second portion of the first virtual object that would be occluded by the end user's hand is not rendered in response to detecting that the palm of the end user's hand is facing away from the mobile device, the one or more processors cause a position of the first virtual object within the augmented reality environment to be snapped to a center of the end user's hand prior to rendering the one or more images in response to detecting the interaction with the first virtual object, the object manipulation gesture corresponds with a grabbing gesture; and
   a see-through display in communication with the one or more processors, the see-through display displays the one or more images of the first virtual object such that the first virtual object is perceived to exist within the augmented reality environment.

2. The electronic device of claim 1, wherein:
   the one or more processors determine a material property associated with the first virtual object, the one or more processors determine the feedback response based on the magnitude of the virtual force and the material property.

3. The electronic device of claim 1, wherein:
   the one or more processors determine a region within the augmented reality environment associated with the first virtual object, the one or more processors detect the interaction with the first virtual object by detecting the object manipulation gesture being performed within the region, the region extends beyond the first virtual object by a particular distance.

4. The electronic device of claim 1, wherein:
   the feedback response includes a haptic response, the haptic response comprises a vibrating of the electronic device.

5. The electronic device of claim 1, wherein:
   the one or more processors shift a position of the first virtual object within the augmented reality environment such that the first portion of the first virtual object appears between a thumb and index finger of the end user's hand.

6. The electronic device of claim 1, wherein:
   the feedback response includes a haptic response, the haptic response comprises a vibrating of a second electronic device different from the electronic device at a particular magnitude that is proportional to the magnitude of the virtual force.

7. A method for providing feedback associated with virtual object interactions, comprising:
   acquiring one or more virtual objects associated with an augmented reality environment, the one or more virtual objects include a first virtual object;
   determining an object classification associated with the first virtual object;
   detecting an interaction with the first virtual object by an end user of a mobile device;
   determining a magnitude of a virtual force associated with the interaction;
   determining a feedback response in response to detecting the interaction based on the magnitude of the virtual force and the object classification;
   outputting the feedback response;
   detecting that a palm of the end user's hand is facing away from the mobile device;
   rendering one or more images corresponding with the first virtual object such that a first portion of the first virtual object is rendered and a second portion of the first virtual object that would be occluded by the end user's hand is not rendered in response to detecting that the palm of the end user's hand is facing away from the mobile device, the rendering one or more images corresponding with the first virtual object includes snapping a position of the first virtual object to a center of the end user's hand prior to rendering the one or more images in response to detecting the interaction with the first virtual object, the interaction corresponds with a grabbing gesture; and
   displaying the one or more images on the mobile device.

8. The method of claim 7, further comprising:
   determining a material property associated with the first virtual object, the determining a feedback response to the interaction includes determining the feedback response based on the magnitude of the virtual force and the material property.

9. The method of claim 7, further comprising:
   determining a region within the augmented reality environment associated with the first virtual object, the detecting an interaction with the first virtual object includes detecting the object manipulation gesture being performed within the region.

10. The method of claim 9, wherein:
    the region extends beyond the first virtual object by a particular distance.

11. The method of claim 7, wherein:
the rendering one or more images includes shifting a position of the first virtual object within the augmented reality environment such that the first portion of the first virtual object appears between a thumb and index finger of the end user's hand.

12. The method of claim 7, wherein:
the feedback response includes a haptic response, the haptic response comprises a vibrating of an electronic device at a particular magnitude that is proportional to the magnitude of the virtual force.

13. The method of claim 7, wherein:
the object classification is associated with metallic virtual objects.

14. The method of claim 7, wherein:
the mobile device comprises an HMD;
the acquiring one or more virtual objects is performed by the HMD;
the detecting an interaction with the first virtual object is performed by the HMD; and
the determining a feedback response to the interaction is performed by the HMD.

15. One or more physical hardware storage devices containing processor readable code for programming one or more processors to perform a method for providing feedback associated with virtual object interactions comprising the steps of:
acquiring a first virtual object associated with an augmented reality environment;
determining an object classification associated with the first virtual object;
detecting an object manipulation gesture within the augmented reality environment performed by an end user of a mobile device;
detecting an interaction with the first virtual object in response to detecting the object manipulation gesture;
determining a magnitude of a virtual force associated with the interaction;
determining a feedback response to the interaction based on the magnitude of the virtual force and the object classification;
outputting the feedback response, the feedback response includes at least one of a visual response, an audio response, or a haptic response;
detecting that a palm of the end user's hand is facing away from the mobile device;
rendering one or more images corresponding with the first virtual object such that a first portion of the first virtual object is rendered and a second portion of the first virtual object that would be occluded by the end user's hand is not rendered in response to detecting that the palm of the end user's hand is facing away from the mobile device, the rendering one or more images corresponding with the first virtual object includes snapping a position of the first virtual object to a center of the end user's hand prior to rendering the one or more images in response to detecting the interaction with the first virtual object, the object manipulation gesture corresponds with a grabbing gesture; and
displaying the one or more images on a mobile device.

16. The one or more physical hardware storage devices of claim 15, further comprising:
determining a material property associated with the first virtual object, the determining a feedback response to the interaction includes determining the feedback response based on the material property, the audio response comprises a sound effect associated with the material property.

17. The one or more physical hardware storage devices of claim 15, further comprising:
determining a region within the augmented reality environment associated with the first virtual object, the detecting an interaction with the first virtual object includes detecting the object manipulation gesture being performed within the region, the region extends beyond the first virtual object by a particular distance.

* * * * *